United States Patent
Hansen et al.

(10) Patent No.: US 8,185,603 B2
(45) Date of Patent: May 22, 2012

(54) METHOD FOR ACCESSING A FUNCTION OF A REAL-WORLD OBJECT

(75) Inventors: Magne Hansen, Eskilstuna (SE); Thomas Pauly, Västerås (SE); Johan Andersson, Västerås (SE)

(73) Assignee: ABB AB, Västerås (SE)

( * ) Notice: Subject to any disclaimer, the term of this patent is extended or adjusted under 35 U.S.C. 154(b) by 1259 days.

(21) Appl. No.: 10/539,277

(22) PCT Filed: Dec. 16, 2003

(86) PCT No.: PCT/SE03/01984
§ 371 (c)(1),
(2), (4) Date: Jan. 30, 2006

(87) PCT Pub. No.: WO2004/057471
PCT Pub. Date: Jul. 8, 2004

(65) Prior Publication Data
US 2006/0129683 A1    Jun. 15, 2006

(30) Foreign Application Priority Data
Dec. 19, 2002  (SE) .................................. 0203779

(51) Int. Cl.
*G06F 15/16* (2006.01)
(52) U.S. Cl. .................................. 709/217; 717/178
(58) Field of Classification Search .................. 709/217, 709/219
See application file for complete search history.

(56) References Cited

U.S. PATENT DOCUMENTS

| | | | |
|---|---|---|---|
| 5,991,802 A * | 11/1999 | Allard et al. ................. | 709/219 |
| 6,061,603 A * | 5/2000 | Papadopoulos et al. ........ | 700/83 |
| 6,170,007 B1 | 1/2001 | Venkatraman et al. | |
| 6,400,997 B1 | 6/2002 | Rapp, III | |
| 6,529,936 B1 | 3/2003 | Mayo et al. | |
| 6,792,605 B1 | 9/2004 | Roberts et al. | |
| 7,010,294 B1 * | 3/2006 | Pyotsia et al. ................ | 455/420 |
| 2001/0042081 A1 * | 11/2001 | MacFarlane et al. .......... | 707/513 |
| 2002/0059282 A1 * | 5/2002 | Andersson et al. ........... | 707/100 |
| 2002/0059470 A1 | 5/2002 | Allard et al. | |
| 2002/0143822 A1 * | 10/2002 | Brid et al. ..................... | 707/522 |
| 2002/0152289 A1 * | 10/2002 | Dube ............................ | 709/220 |

FOREIGN PATENT DOCUMENTS
EP   0969389 A2   1/2000
(Continued)

OTHER PUBLICATIONS

Topp et al., "Web Based Service for Embedded Devices" [Online], Oct. 2002 [Retrieved Nov. 2009], Springer Berlin Heidelberg, <http://www.springerlink.com/content/u9hbthhvfhutuhwm/fulltext.pdf>, pp. 141-153.*

(Continued)

*Primary Examiner* — Bunjob Jaroenchonwanit
(74) *Attorney, Agent, or Firm* — Venable LLP; Eric J. Franklin

(57) ABSTRACT

A method to provide access to Aspects of Aspect Objects from a standard web browser. A web browser sends a request of access to a certain Aspect of an Aspect Object. The request includes a URL address. The URL address specifies the Aspect, the Aspect Object. The method enables the use of thin clients to access Aspects of Aspect Objects representing functions of real world objects connected to a control system.

15 Claims, 3 Drawing Sheets

FOREIGN PATENT DOCUMENTS

| | | | |
|---|---|---|---|
| EP | 1220507 A1 | | 7/2002 |
| WO | WO 01/02953 | * | 1/2001 |
| WO | WO 0102953 A1 | * | 1/2001 |

OTHER PUBLICATIONS

Varadarajan et al., "ComponentXchange: An E-Exchange for Software Components" [Online], 2002 [Retrieved Nov. 2009], IADIS, <http://www.iadis.net/dl/final_uploads/200201L008.pdf>, pp. 1-11.*

Bratthall et al., "Integrating Hundred's of Products Through One Architecture—The Industrial IT Architecture" [Online], May 2002 [Retrieved Nov. 2009], ACM, <http://delivery.acm.org/10.1145/590000/581416/p604-bratthall.pdf?key1=581416&key2=3871948521&coll=GUIDE&dl=GUIDE&CFID=62096145&CFTOKEN=60756782>, pp. 1-11.*

Fielding et al., "RFC 2068: Hypertext Transfer Protocol—HTTP/1.1" [Online], Jan. 1997 [Retrieved Nov. 2009], Network Working Group, <http://www.faqs.org/ftp/rfc/pdf/rfc2068.txt.pdf>, pp. 1 and 94-139.*

Topp et al., "Web Based Service for Embedded Devices" [online], Oct. 2002 [retrieved Jun. 2010], Springer-Verlag, vol. 2593, <http://www.springerlink.com/content/u9hbthhvfhutuhwm/fulltext.pdf> pp. 141-153.*

ABB, "Integrate IT Aspect Integrator Platform TM Version 2.0 Integration Guideline", Jun. 2002, pp. 1-82.*

* cited by examiner

METHOD FOR ACCESSING A FUNCTION OF A REAL-WORLD OBJECT

TECHNICAL FIELD

The present invention is concerned with control systems where real-world objects are represented as Aspect Objects. The method and the system according to the invention are particularly suitable for use in industrial plants in industries such as a chemical, pharmaceutical, food, metal, mines, building material, pulp and paper. Other industries and utilities where the invention is particularly useful are automotive, consumer products, power generation, power distribution, waste water handling, oil refineries, pipelines and offshore platforms.

BACKGROUND ART

WO00102953 entitled "Method of integrating an application in a computerized system" describes a method to represent real-world objects in a computerized system in a systematic way, in which different types of information about the real-world object may be obtained, linked to the real-world entity, processed, displayed and acted on. In WO 01/02953, a real-world object is represented by a certain kind of software object called a composite object. Each application integrated in the computerized system defines interfaces that are independent of the implementation of the application itself. These interfaces may be used by other applications, implementing other aspects or groups of aspects of a composite object (in this description a composite object is referred to as an Aspect Object), such that the applications can cooperate to provide functionality for the representation of a real-world entity that is the sum of all aspects. A problem with the disclosed method is that it requires that certain software modules be installed on a client device in order to access the application integrated in the system. Another problem with the method disclosed in WO00102953 is that it does not disclose how to resolve access to an aspect of Aspect Object via the Internet or via an intranet based on Internet technology.

U.S. Pat. No. 6,170,007 describes how a web server in a device provides access to the user interface functions for the device through a device web page. A network interface in the device enables access to the web page by a web browser such that a user of the web browser accesses the user interface functions for the device through the web page.

U.S. Pat. No. 6,400,997 describes an apparatus and a method for factory automation and tracking with focus on a factory automation apparatus which includes a plurality of portable tablets and an automation server in a wireless communication.

There are a number of enabling technologies that enable remote access across a network. Examples of such technologies are RPC (Remote Procedure Calls), DCOM (Distributed COM) and CORBA (Common Object Request Broker Architecture). Another example of a technology enabling remote access to objects by use of Internet technologies is called Web Services.

WO 0077653A1 describes a method and apparatus for providing network services for businesses. The description discloses how HTTP (Hypertext Transfer Protocol) may be used, including the HTTP methods GET and POST to provide input data for a web service. The description also includes such functions as one called a Web Service Provider and one called a Web Services Directory. The latter function provides information about which web services are available and where they may be found. A remaining problem is how to get access from a web browser to different functions of a real-world object represented as an Aspect Object, such as a CAD drawing or maintenance record of the device, where the functionality resides in a number of unrelated applications.

SUMMARY OF THE INVENTION

An object of the invention is to provide access from a web presentation means to an Aspect of an Aspect Object representing a function of a real-world object and to adapt a response message, not only to the performed function, but also to contextual information about the web presentation means. A web presentation means is any type of presentation means used to access and present information available via the Internet or an intranet. In a preferred embodiment, the web presentation means is a web browser. The contextual information describes characteristics of the web presentation means.

The above object is achieved by a method comprising the step of receiving a web request in a web server, which web request is sent by a web presentation means and said web request comprises a Uniform Resource Locator (URL), which comprises means to identify the Aspect Object and the Aspect of the Aspect Object. The method comprises the additional step of identifying in a software application the Aspect Object and the Aspect by use of information in the URL. Further, the method comprises the step of querying the identified Aspect Object from the software application for an interface to an Aspect System Object associated with the Aspect. The method also comprises the step of querying the identified Aspect Object from the software application for an interface to an Aspect System Object associated with the Aspect. A further step is receiving from the Aspect System Object to the software application a reference to an interface of the Aspect System Object, which implements the function of the identified Aspect, and invoking functionality of the Aspect by means of the reference. It also comprises the further step of sending a response message to the world wide web presentation means, which response message is adapted to contextual information which describes characteristics of the world wide web presentation means, wherein the world wide web presentation means is updated with the result of the performed function of the real-world object.

According to a preferred embodiment, the contextual information is comprised in the web request sent from the world wide web presentation means.

According to another preferred embodiment, the response message is adapted according to the contextual information by an Aspect System Object.

In one embodiment, the response message is adapted as an HTTP response. In another embodiment the response message is adapted according to extensible markup language (XML).

An advantage with the invention is that it enables access from a web presentation means to an Aspect of an Aspect object without having to pre-install other software than standard software on the client device.

Another advantage with the invention is that it enables access to an Aspect of an Aspect Object from any type of a device which hosts a web presentation means.

It should be appreciated that the Aspect associated with capabilities of the above described method may be inherited to an Aspect Object other than the Aspect Object previously referred to. Such inheritance is made in run-time between Aspect Objects through a hierarchical structure, while the operation of the real-world objects is maintained.

A further object of the invention is to provide a control system comprising a web server, an Aspect Object, an Aspect System Object and a software application characterized in that the system executes the steps of the above described method.

Yet another object of the invention is to provide a computer program product which when run on a computer or a processor causes said computer or processor to carry out one or more steps of the above described method.

An Aspect Object is a certain type of software object. Different functions or facets of a real-world object, such as its physical location, the current stage in a process, a control function, an operator interaction, a simulation model, some documentation about the real-world object are described as different Aspects of the Aspect Object. Each Aspect Object is a container for one or more Aspects. An Aspect Object is not an object in the traditional meaning of object-oriented systems, but rather a container of references to such traditional objects, which implement the different Aspects.

BRIEF DESCRIPTION OF THE DRAWINGS

The present invention will be described in more detail in connection with the enclosed schematic drawings.

DETAILED DESCRIPTION OF THE INVENTION

Figure 1:
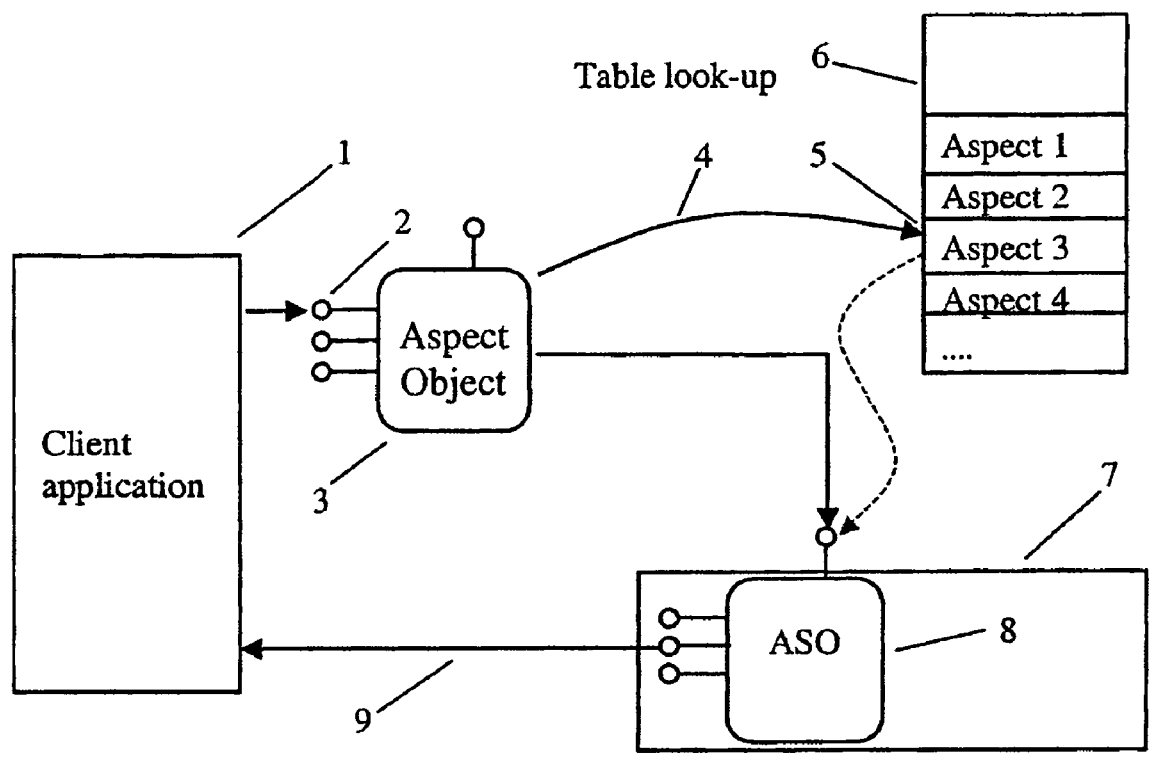
FIG. 1 shows an overview of a method according to prior art for a client application to access a software application available for access via an Aspect System Object.

In order to appreciate the invention it is advantageous to study some specific prior art. WO00102953, hereby incorporated by reference, describes a method for integration of many and various types of applications in a computerized system, based on a concept where real-world objects are represented as Aspect Objects. FIG. 1 shows a schematic overview of how, according to prior art, a client application 1 queries an Aspect Object 3 for a function associated with an Aspect, the system finds a reference to an interface of an Aspect System Object 8 by means of a Table look-up 4, the reference is returned to the client 9. The Aspect System Object 12 may contain several references to traditional objects and software applications.

Figure 2:
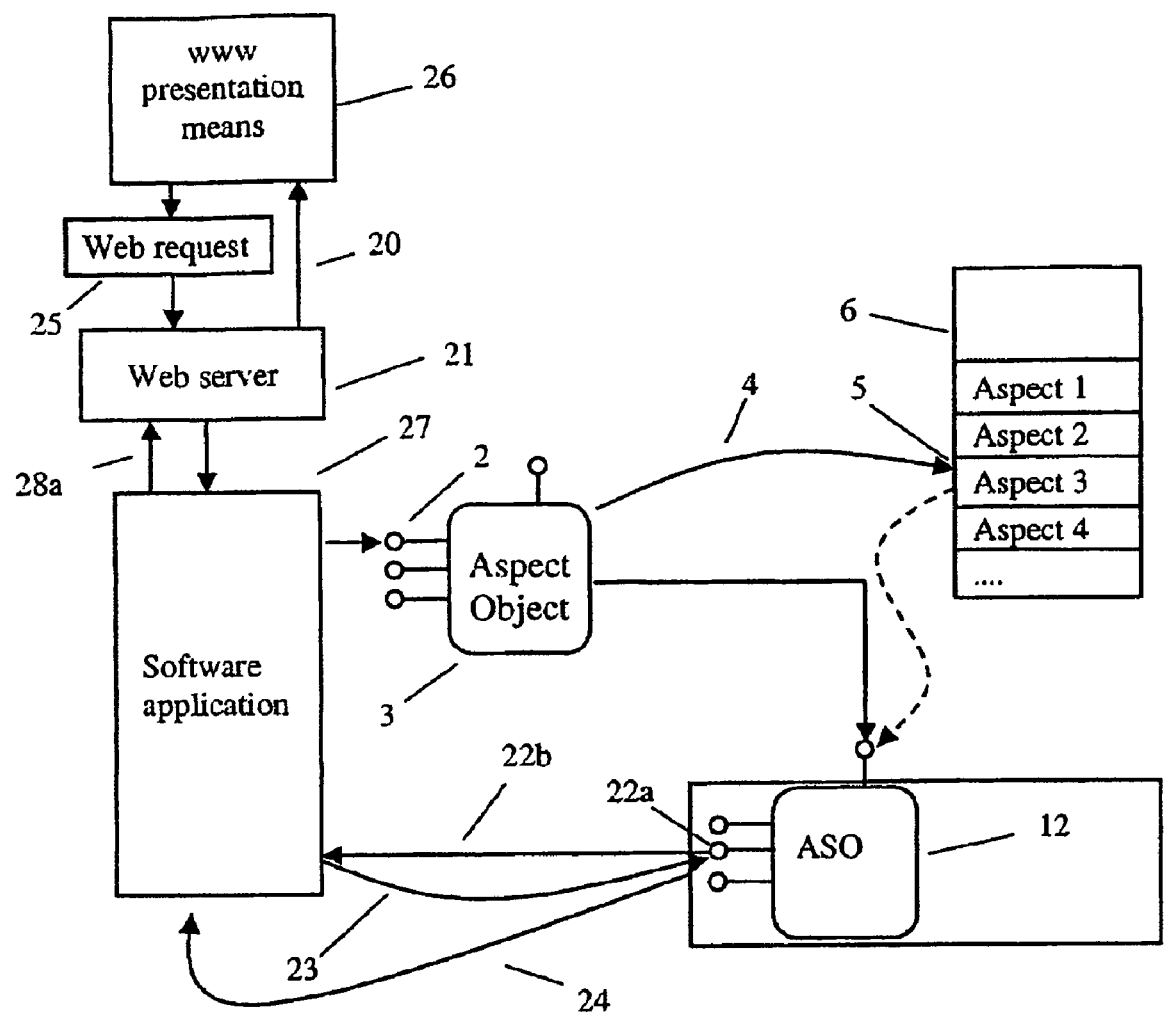
FIG. 2 shows a schematic overview of a method based on the invention.

FIG. 2 shows an overview of a method according to the invention. The invention enables access to at least one aspect of an Aspect Object 3 from a world wide web (www) presentation means 26. A world wide web presentation means 26 is any type of presentation means used to access and present information available via the Internet or an intranet. An example of a world wide web presentation means is a web browser. Examples of devices capable of executing such world wide web presentation means 26 are a personal computer, a cell phone, a Personal Digital Assistant (PDA) or a hand-held computing device. In a preferred embodiment, no additional software is necessary to be pre-installed in such a device hosting the world wide web presentation means 26. It should be appreciated that by using an embodiment of the invention, a user 31 (shown in FIG. 3), such as a process operator, may select and access an Aspect Object of an Aspect Object 3 from a standard world wide web presentation means 26. This in contrast to what was previously known in prior art.

Figure 3:
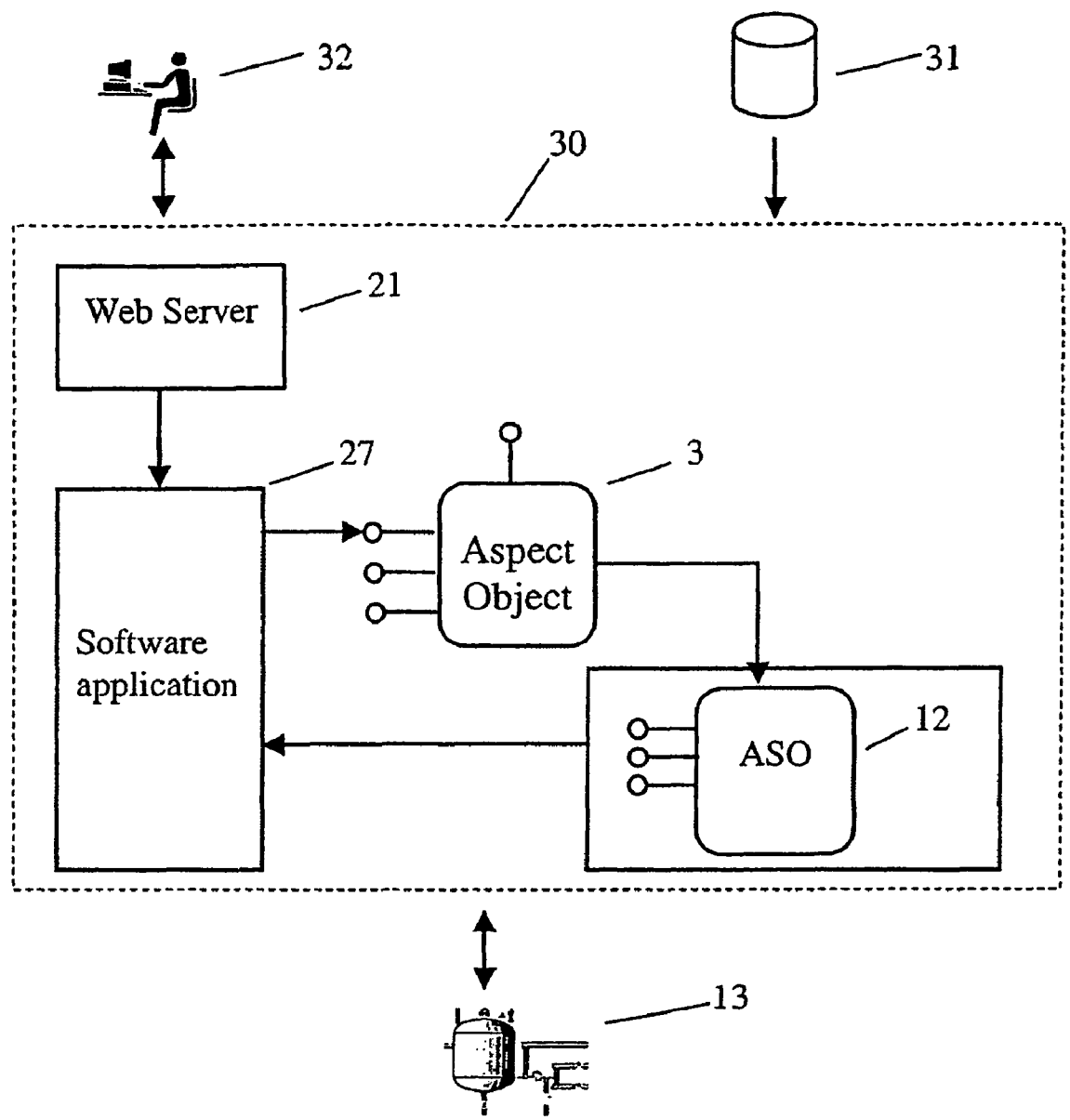
FIG. 3 shows a schematic overview of a system based on the invention where a user of a web presentation means such as a thin client gets access to a function of a real-world object accessible via an Aspect System Object via a web server.

Further FIG. 2 shows that a web server 21 and a software application 27 provides access to an Aspect of an Aspect Object 3 relating to a real-world object 13, such as the real-world object shown in FIG. 3. The presentation of the Aspect Object 3 can be made in multiple ways. As an example the world wide web presentation means 26 may present the Aspect Object 3 in structures or in process graphics. The world wide web presentation means 26 may also present the Aspect Object 3 in text fields, which is a particular advantage if the world wide web presentation means 26 executes on a device with a small display such as a cell phone. A method according to the invention provides a response to a request for a function of a real-world object 13 connected to a control system 30, which function is represented as an Aspect of an Aspect Object. In a method according to the invention, the world wide web presentation means 26 may choose to invoke a certain Aspect of an Aspect Object 3. FIG. 3 shows that the request for a function to a system based on the invention may be initiated by a user 32, such as a process operator or engineer. As an example, initiating a request for a function is performed by a point-and-click action by the user on a PDA or a personal computer.

FIG. 2 shows that in a method according the invention the world wide web presentation means 26 sends a web request 25 comprising a Uniform Resource Locator (URL) address with the purpose of getting access to such an Aspect. An example of such a URL is
http://xyz.com/production?object=pump&aspect=faceplate In the example above, the Aspect Object 3 is a pump and the Aspect of the pump is a face plate. The URL comprises means to identify an Aspect Object 3 and also means to identify an Aspect of that Aspect Object 3. The means to identify an Aspect Object 3 may be a name, a path, an object id or other identification used in the URL in order to identify the Aspect Object 3. The URL also comprises a name, id or other identification of the Aspect which in the example is the face plate. The URL above is an example and in an embodiment of the invention alternative syntax may be used. For instance, the URL string may be comprised in a message defined according to extensible markup language (XML). Further FIG. 2 shows that, according to the method, the web server 21 passes the contents of the web request 25 to at least one software application 27. The software application 21 has also received contextual information about the accessing world wide web presentation means 26. The contextual information may comprise information on type of browser, available plug-ins, type of cell phone, screen resolution and/or national language. In a preferred embodiment of the invention the contextual information of the world wide web presentation means 26 is included in the web request 25. The purpose of using the contextual information is to adapt the response message 20 to the web request 25 according to the information about the world wide web presentation means 26. As an example, a response message, which comprises a text string, may be adapted to the size of the screen of a cell phone. Another example of how to utilize the contextual information is that, depending on the national language of the web presentation means, the response message may be adapted to the national language.

The software application 27 identifies the Aspect Object 3 and the Aspect from information specified in the URL. Further FIG. 2 shows that the software application 27 queries the identified Aspect Object 3 through a known interface 2 for a reference to an interface of the Aspect System Object 12 associated with the Aspect 5. The reference to the Aspect System Object 12 is found by means of a table look-up 4 where the table comprises a set of Aspects 6. FIG. 2 also shows that the reference 22a to an interface of the Aspect System Object 12, which implements the identified Aspect, is received 22b by the software application 27.

In a preferred embodiment, the contextual information is passed to the Aspect System Object 12. In the preferred embodiment, it is the Aspect System Object 12 that determines which algorithm to use to prepare a response message depending on the contextual information about the world wide web presentation means 26.

FIG. 2 shows in a schematic way that the reference 22a is received by the software application 27. The reference 22a to the interface of the Aspect System Object 12 is preferably received by the software application 27 through the Aspect Object 3, and that as a result of the previously mentioned query sent through the known interface 2. In an alternative embodiment, the reference 22a may be received 22b directly by the software application 27. The software application 27 invokes 23 functionality accessible by the Aspect System Object 12 by means of the reference 22a. As mentioned above, in a preferred embodiment the software application 27 passes the contextual information or a reference to the contextual information about the world wide web presentation means 26 to the Aspect System Object 12. The Aspect System Object 12 performs the requested function defined as an Aspect of a certain Aspect Object 3. Examples of such a function is to close a valve, retrieve maintenance records of a motor or present a list of available suppliers of a spare part. Since the number of Aspect Objects in a control system is typically several thousand, the above mentioned functions are merely examples and should not in any way limit the scope of the invention. Further, in the preferred embodiment the Aspect System Object 12 prepares a response message to the web request 25. The Aspect System Object 12 may, in order to handle the preparation of a response message, download a COM or .NET component which matches the information about the world wide web presentation means 26. The response message is preferably an HTTP response and is adapted to the world wide web presentation means 26. FIG. 2 indicates that the HTTP response may be sent 24 from the Aspect System Object 12 to the software application 27 and further via 28a the web server 21 to the world wide web presentation means 26. One alternative compared to letting the Aspect System Object 12 prepare an HTTP response is to delegate the web request to a second URL and letting the Aspect System object 12 exclusively perform the requested function defined in the URL as an Aspect of an Aspect Object. Hence, in such an alternative it is functionality accessed by the second URL that handles the adaptation of the response message according to the contextual information. Yet another alternative, compared to letting the Aspect System Object prepare an HTTP response, is to let the Aspect System Object 12 prepare a response as extensible markup language (XML) data. In such an alternative embodiment, the Aspect System Object 12 generates a key that describes the class of data. The key is used to select a transform that converts the data into HyperText Markup Language (HTML), which is passed back to the world wide web presentation means 26 as a response message.

In an alternative embodiment, the contextual information is used by the software application 27 to determine which reference 22a to the Aspect System Object 12 to query for. In the alternative embodiment, it is the software application that determines which algorithm to use in order to adapt the response message according to the contextual information. In the alternative embodiment, the software application 27 receives 22b a plurality of references 22a to the Aspect System Object 12 which each implements the Aspect specified in the web request 25.

It should be appreciated that the Aspect associated with capabilities of the above described method may be inherited to Aspect Object other than the Aspect Object previously referred to. The invention is particularly useful in that the inheritance takes place during run-time of the Aspect Objects, that is after the Aspect Objects have been created and/or initiated. For instance, it may be so that initially at a plant the method is applied to an Aspect Object representing a certain type of Direct Current (DC) motor with one type of characteristics. A method according to the invention is easily applied to another type of motor with other characteristics at a later time by letting a corresponding Aspect Object inherit the association of the Aspect System Object capable of preparing a response message. Such inheritance is made in run-time between Aspect Objects through a hierarchical structure, while the operation of the real-world objects is maintained.

FIG. 3 shows an overview of a control system 30 based on the invention. The control system 30 comprises a web server 21, a software application 27, and Aspect Object 3 and an Aspect System Object 12 and is able to execute the above described method.

The invention claimed is:

1. A control system comprising a web server, an Aspect Object, an Aspect System Object and a software application, wherein the system executes a method comprising
   generating a web request for the function of the real world object with a world wide web presentation unit installed on a device, the web request comprising a Uniform Resource Locator comprising an identifier configured to identify the Aspect Object and the Aspect of the Aspect Object, the web request further comprising contextual information regarding the device and characteristics of the world wide web presentation unit, wherein the function comprises closing a valve, retrieving maintenance records of a motor, presenting a list of available suppliers, physical location, current stage in a process, a control function, an operator interaction, a simulation model, and documentation about the real-world object,
   transmitting the web request from the device through a network,
   receiving the web request in a web server of the control system,
   transmitting the web request to a software application unrelated to the world wide web presentation unit,
   identifying in the software application of the control system the Aspect Object and the Aspect by use of information in the Uniform Resource Locator,
   querying the identified Aspect Object from the software application for a reference to an interface to an Aspect System Object associated with the Aspect,
   receiving from the Aspect System Object to the software application the reference to the interface of the Aspect System Object, which implements the function of the identified Aspect,
   transmitting one of the contextual information or a reference to the contextual information about the world wide web presentation unit by the software application to the Aspect System Object,
   invoking functionality of the Aspect with the software application utilizing the reference to carry out the function of the real-world object,
   sending a response message from the web server to the world wide web presentation unit, wherein the response message is adapted to the contextual information, and updating the world wide web presentation unit with the result of the performed function of the real-world object.

2. A computer program product, comprising:
computer program instructions stored in a device and a control system which when run on a computer or a processor causes said computer or processor to carry out a method comprising
generating a web request for the function of the real world object with a world wide web presentation unit installed on a device, the web request comprising a Uniform Resource Locator comprising an identifier configured to identify the Aspect Object and the Aspect of the Aspect Object, the web request further comprising contextual information regarding the device and characteristics of the world wide web presentation unit, wherein the function comprises closing a valve, retrieving maintenance records of a motor, presenting a list of available suppliers, physical location, current stage in a process, a control function, an operator interaction, a simulation model, and documentation about the real-world object,
transmitting the web request from the device through a network,
receiving the web request in a web server of the control system,
transmitting the web request to a software application unrelated to the world wide web presentation unit,
identifying in the software application of the control system the Aspect Object and the Aspect by use of information in the Uniform Resource Locator,
querying the identified Aspect Object from the software application for a reference to an interface to an Aspect System Object associated with the Aspect,
receiving from the Aspect System Object to the software application the reference to the interface of the Aspect System Object, which implements the function of the identified Aspect,
transmitting one of the contextual information or a reference to the contextual information about the world wide web presentation unit by the software application to the Aspect System Object,
invoking functionality of the Aspect with the software application utilizing the reference to carry out the function of the real-world object,
sending a response message from the web server to the world wide web presentation unit, wherein the response message is adapted to the contextual information, and
updating the world wide web presentation unit with the result of the performed function of the real-world object.

3. A method to respond to a request for a function of a real-world object connected to a control system, which function is represented as an Aspect of an Aspect Object, the method comprising:
generating a web request for the function of the real world object with a world wide web presentation unit installed on a device, the web request comprising a Uniform Resource Locator comprising an identifier configured to identify the Aspect Object and the Aspect of the Aspect Object, the web request further comprising contextual information regarding the device and characteristics of the world wide web presentation unit, wherein the function comprises closing a valve, retrieving maintenance records of a motor, presenting a list of available suppliers, physical location, current stage in a process, a control function, an operator interaction, a simulation model, and documentation about the real-world object,
transmitting the web request from the device through a network,
receiving the web request in a web server of the control system,
transmitting the web request to a software application unrelated to the world wide web presentation unit,
identifying in the software application of the control system the Aspect Object and the Aspect by use of information in the Uniform Resource Locator,
querying the identified Aspect Object from the software application for a reference to an interface to an Aspect System Object associated with the Aspect,
receiving from the Aspect System Object to the software application the reference to the interface of the Aspect System Object, which implements the function of the identified Aspect,
transmitting one of the contextual information or a reference to the contextual information about the world wide web presentation unit by the software application to the Aspect System Object,
invoking functionality of the Aspect with the software application utilizing the reference to carry out the function of the real-world object,
sending a response message from the web server to the world wide web presentation unit, wherein the response message is adapted to the contextual information, and
updating the world wide web presentation unit with the result of the performed function of the real-world object.

4. The method according to claim 1, wherein the response message is adapted according to the contextual information by an Aspect System Object.

5. The method according to claim 4, wherein the response message is adapted as an HTTP response.

6. The method according to claim 4, wherein the response message is adapted according to extensible markup language.

7. The method according to claim 1, wherein the Aspect Object during run-time inherits the Aspect from another Aspect Object through a hierarchical structure, wherein the Aspect Object during run-time inherits the association of the Aspect System Object.

8. The method according to claim 1, wherein the world wide web presentation unit is a standard web browser.

9. The method according to claim 8, wherein the web browser is installed on a wireless device.

10. The method according to claim 9, wherein the wireless device is a cell phone Personal Digital Assistant, a cell phone or a handheld computing device.

11. The method according to claim 1, wherein the contextual information of the world wide web presentation unit describes technical characteristics of the world wide web presentation unit.

12. The method according to claim 11, wherein technical characteristics of the world wide web presentation unit comprise type of web browser, available plug-ins or screen resolution.

13. The method according to claim 1, wherein the identifying in the software application comprises evaluating in the software application which function of the Aspect System Object for the software application to query for a reference based on the contextual information in addition to the identified Aspect Object, the Aspect of the Aspect Object.

14. The method according to claim 1, wherein each Aspect Object comprises a plurality of references to objects that implement the Aspects, wherein the Aspects comprise functions or facets of a real-world object.

15. The method according to claim 14, wherein the functions or facets of the real-world object comprise at least one of a physical location, a current stage in a process, a control function, an operator interaction, a simulation model, or documentation about the real-world object.

* * * * *